(12) United States Patent
Langewiesche

(10) Patent No.: US 11,274,691 B2
(45) Date of Patent: Mar. 15, 2022

(54) SCREW ELEMENT

(71) Applicant: SPAX INTERNATIONAL GMBH & CO. KG, Ennepetal (DE)

(72) Inventor: Frank Langewiesche, Sprockhövel (DE)

(73) Assignee: SPAX INTERNATIONAL GMBH & CO. KG, Ennepetal (DE)

( * ) Notice: Subject to any disclaimer, the term of this patent is extended or adjusted under 35 U.S.C. 154(b) by 298 days.

(21) Appl. No.: 16/612,226

(22) PCT Filed: May 8, 2018

(86) PCT No.: PCT/EP2018/061888
§ 371 (c)(1),
(2) Date: Nov. 8, 2019

(87) PCT Pub. No.: WO2018/210637
PCT Pub. Date: Nov. 22, 2018

(65) Prior Publication Data
US 2021/0140461 A1    May 13, 2021

(30) Foreign Application Priority Data
May 15, 2017  (EP) .................................. 17170965.2

(51) Int. Cl.
*F16B 25/00* (2006.01)
*F16B 25/10* (2006.01)

(52) U.S. Cl.
CPC ...... *F16B 25/0084* (2013.01); *F16B 25/0078* (2013.01); *F16B 25/106* (2013.01); *F16B 25/00* (2013.01)

(58) Field of Classification Search
CPC .. F16B 25/00; F16B 25/0015; F16B 25/0078; F16B 25/0084; F16B 25/106; F16B 33/02; F16B 35/041; F16B 35/042
(Continued)

(56) References Cited

U.S. PATENT DOCUMENTS 8,926,249 B2 *  1/2015  Lin .................... F16B 25/0057
                                                              411/386
9,494,179 B2 * 11/2016  Langewiesche ...... F16B 25/106
(Continued)

FOREIGN PATENT DOCUMENTS

DE    202010010250 U1   12/2010
EP         2806174 A1   11/2014
(Continued)

OTHER PUBLICATIONS

"International Preliminary Report on Patentability for PCT Patent Application No. PCT/EP2018/061888", dated Apr. 26, 2019, 12 Pages.
(Continued)

*Primary Examiner* — Roberta S Delisle
(74) *Attorney, Agent, or Firm* — Calfee, Halter & Griswold LLP

(57) ABSTRACT

The present invention relates to a screw element (1) comprising a threaded shaft (2), a screw tip (4) formed on one shaft end and a screw head (5), formed on an opposite shaft end and with force application means (7), and comprising a screw thread (12) extending on the threaded shaft (2) and on the screw tip (4), wherein the screw tip (4) has a front tip section (4a) tapering toward the screw element end, when viewed in the screwing-in direction (Z), and a section (4b) formed on the threaded shaft with a polygonal cross section, when viewed in cross section, whose enveloping circle diameter ($d_h$) is greater than a core diameter ($d_k$) of the screw tip (4), and the polygonal cross section has a corner point (15) lying on the enveloping circle of the section (4b), and a front edge surface (9), radially oriented with respect to a longitudinal center axis (X-X), ends in said corner point in the sense of an increased diameter. The screw tip (4) has a first tapering tip section (4a) with a circular cross section and a second, cylindrical tip section (4c) with a circular cross
(Continued)

Figure 1:
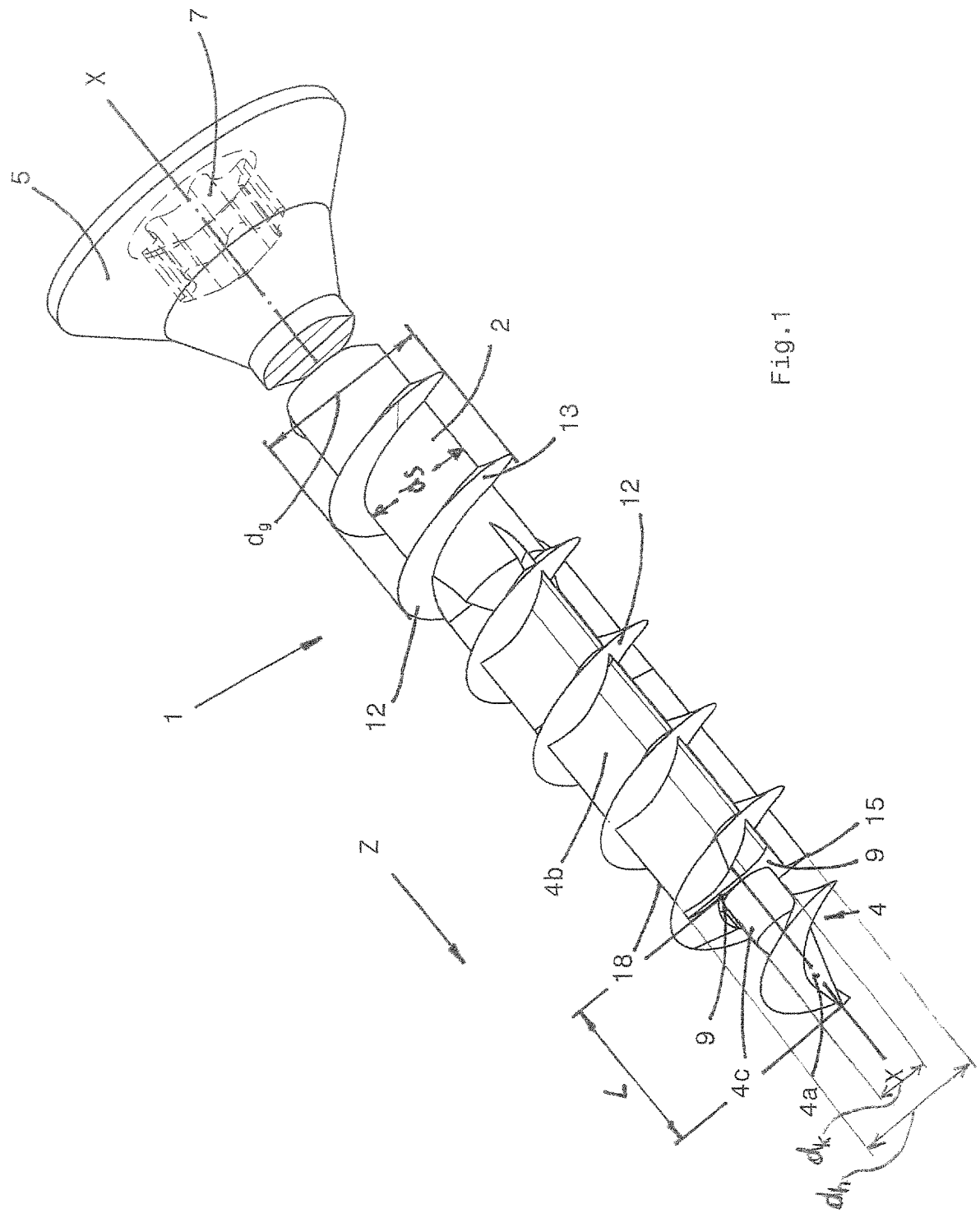

section formed between the first tip section (4*a*) and the polygonal section (4*b*), wherein the screw thread (12) is continuously formed without interruption across the first and second tip sections (4*a*, 4*c*) of the screw tip (4).

20 Claims, 6 Drawing Sheets

(58) Field of Classification Search
USPC .............................. 411/386, 387.5, 411, 424
See application file for complete search history.

(56) References Cited

U.S. PATENT DOCUMENTS

| | | | |
|---|---|---|---|
| 2006/0153662 A1* | 7/2006 | Chen | F16B 25/103 |
| | | | 411/387.1 |
| 2009/0028665 A1* | 1/2009 | Chang | F16B 25/0078 |
| | | | 411/387.3 |
| 2011/0318137 A1* | 12/2011 | Chen | F16B 25/0057 |
| | | | 411/387.1 |
| 2014/0314522 A1* | 10/2014 | Lin | F16B 25/0057 |
| | | | 411/387.1 |
| 2014/0314523 A1* | 10/2014 | Lin | F16B 25/0015 |
| | | | 411/387.4 |
| 2015/0322990 A1* | 11/2015 | Langewiesche | F16B 25/0015 |
| | | | 411/387.1 |
| 2021/0277927 A1* | 9/2021 | Chen | F16B 35/044 |

FOREIGN PATENT DOCUMENTS

| | | |
|---|---|---|
| JP | H10131931 A | 5/1998 |
| WO | 2018210637 A1 | 11/2018 |

OTHER PUBLICATIONS

"International Search Report and Written Opinion for PCT Patent Application No. PCT/EP2018/061888", dated Jul. 10, 2018, 10 Pages.

* cited by examiner

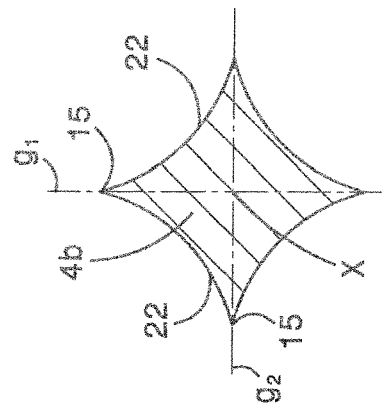
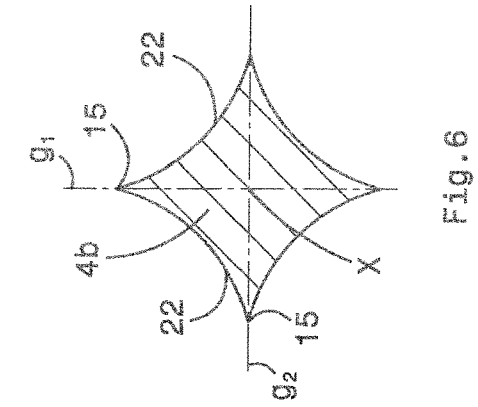
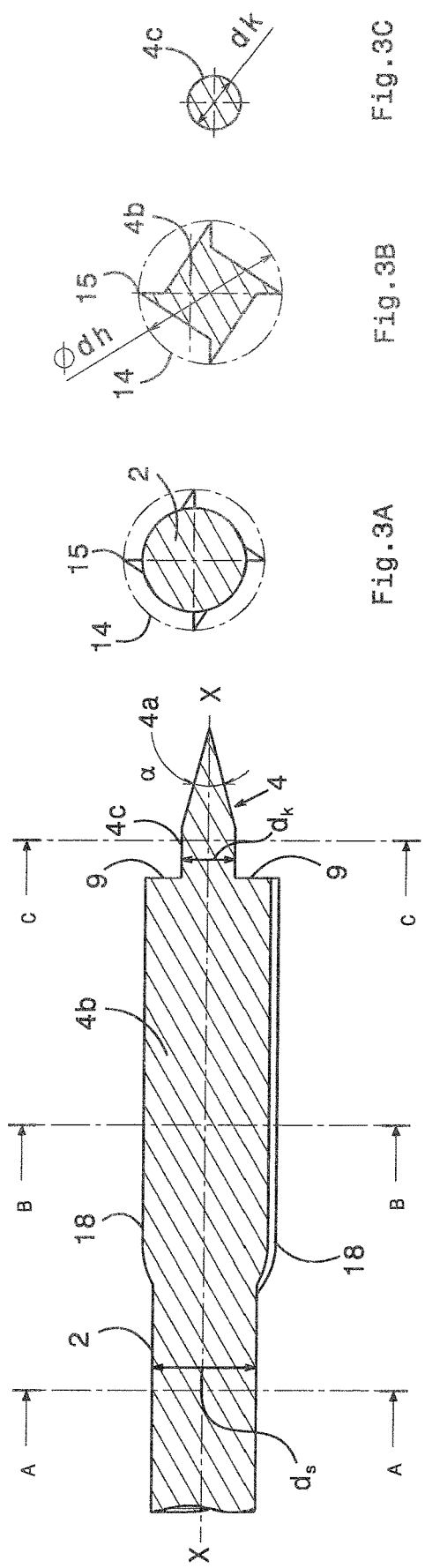
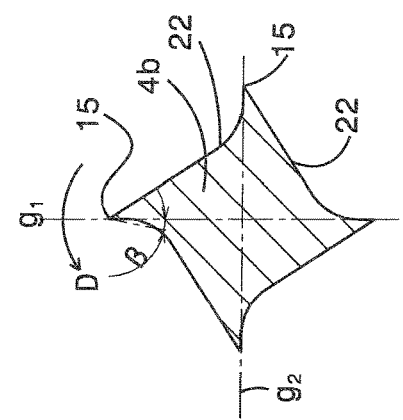
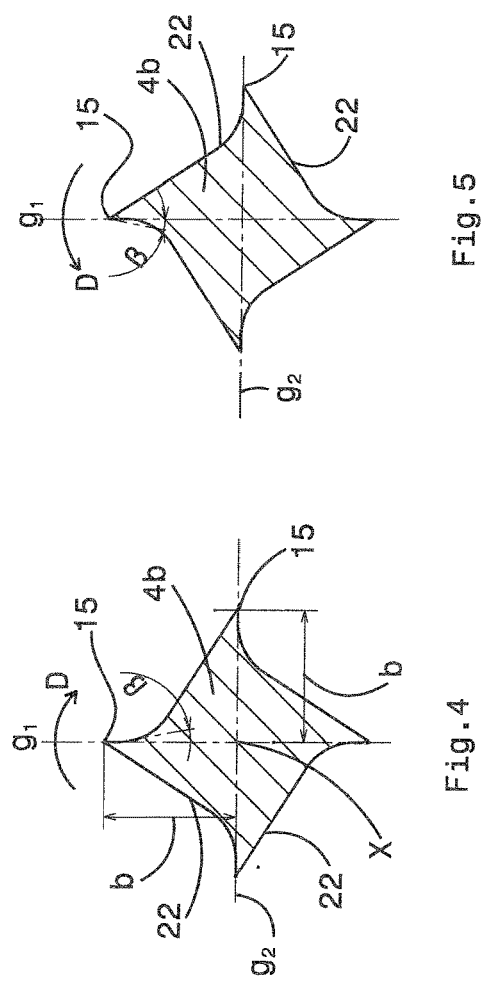

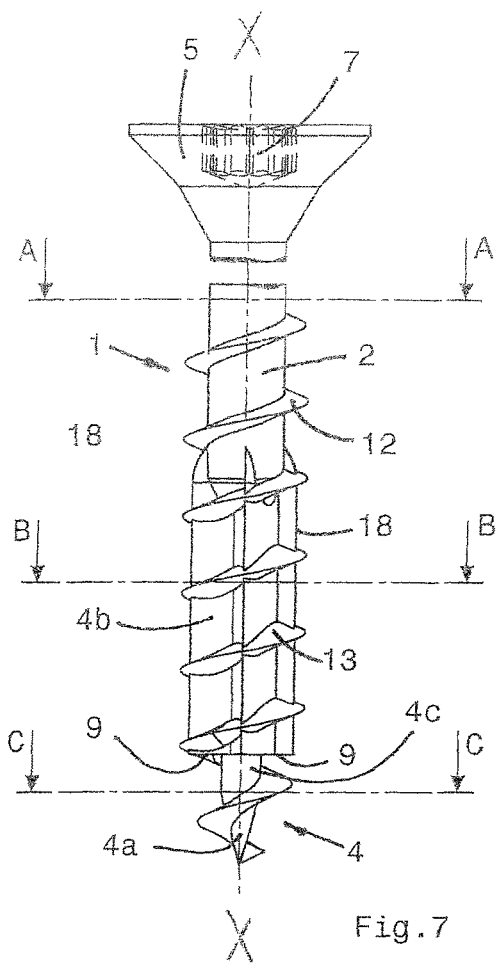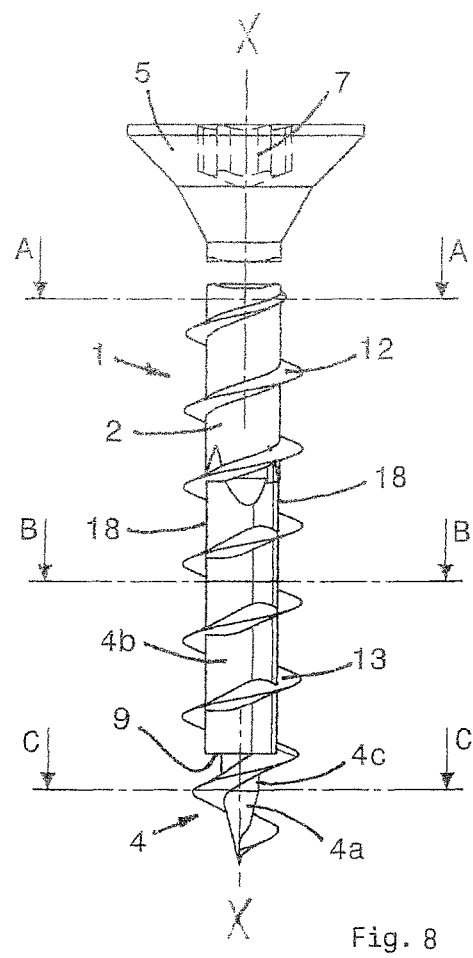
Fig.7   Fig. 8
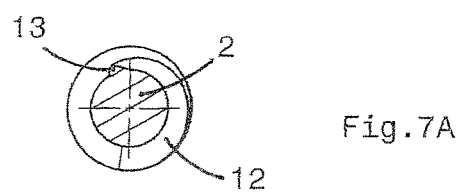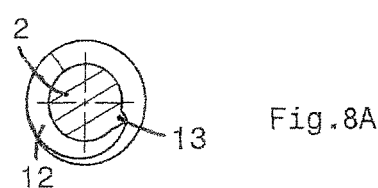
Fig.7A   Fig.8A
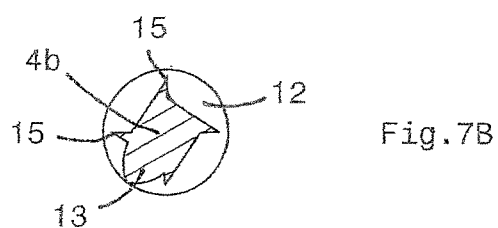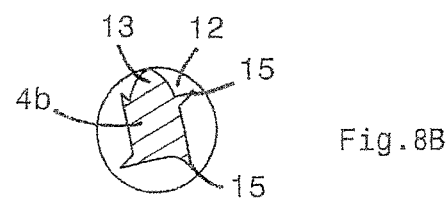
Fig.7B   Fig.8B
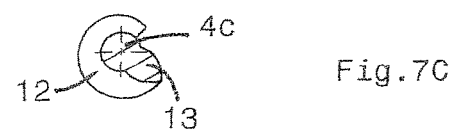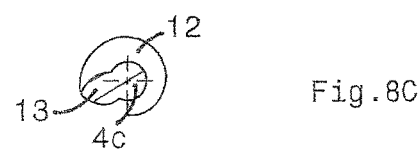
Fig.7C   Fig.8C

SCREW ELEMENT

The present invention relates to a screw element comprising a threaded shaft, a screw tip formed on one shaft end, a screw head with a force application means formed on the opposite shaft end, and with a screw thread extending on the threaded shaft and the screw tip, wherein the screw tip has a front tip section tapering toward the screw element end, when viewed in the screwing-in direction and a section formed on the threaded shaft with a polygonal cross section, when viewed in the cross section, whose enveloping circle diameter is greater than a core diameter of the screw tip, and the polygonal cross section has a corner point lying on the enveloping circle of the section, and a front edge surface, radially oriented with respect to a longitudinal center axis, ends in said corner point in the sense of having an increased diameter.

This type of screw element is known from EP 2 806 174. The polygonal section with its end-side front edge surface, present in this screw element, causes an increasing screw-in torque in the case of hard materials, e.g., hardwood, wherein a manual turning of the screw is not excluded.

The underlying problem of the invention is to improve the screwing-in behavior of the generic screw.

According to the invention, this is achieved in that the screw tip has a first tapering tip section with a circular cross section and a second, cylindrical tip section with a circular cross section between the first tip section and the polygonal section, wherein the screw thread is continuously formed without interruption across the first and second tip section of the screw tip.

The invention is thereby based on the recognition that a failure of the screw element in the area of its tip, which may occur during screwing into a hard material, is caused by an insufficient holding force. According to the invention, a cylindrical section is positioned in front of the front edge surface of the polygonal section, and thus the conically tapering section of the screw tip is displaced away from the front edge surface and also shortened in length with respect to know screws. According to the invention, it is advantageous if the pitch is 40% to 70% of the nominal diameter. The length of the screw tip is in particular 1.0 to 2.0 times the pitch of the screw thread, in particular the screw thread extending on the screw tip.

It is advantageous if the length of the screw tip is 1.0 to 1.5 times the pitch.

It may likewise be advantageous if the tip length is greater than 1.5 times and less than 2.0 times the pitch of the screw thread, wherein the pitch is in particular 40% to 50% of the nominal diameter.

It may be additionally advantageous according to the invention if the diameter of the cylindrical tip section is 40% to 60% of the core diameter of the screw shaft, wherein, e.g., the core diameter of the screw shaft is 55% to 70% of the nominal diameter, preferably 60% to 65% of the nominal diameter.

In one advantageous embodiment of the invention, the diameter of the cylindrical tip section may be 50% of the core diameter of the screw shaft of the screw element.

It is advantageous, according to the invention, if the tip angle, i.e., the inner angle of the tapering tip section is 20° to 40°, in particular 30°.

In one advantageous embodiment, the length of the cylindrical section of the screw tip is 25% to 50% of the total tip length, preferably 40% of the total top length, and the length of the conical first top section is preferably 50% to 75% of the total tip length, preferably 60% of the total tip length.

By forming the screw tip according to the invention, the deformation forces are better accommodated and flexing of the tip section is prevented.

Further advantageous embodiments are contained in the subclaims and the invention is subsequently described in greater detail by way of the exemplary embodiments depicted in the individual figures.

Figure 2:
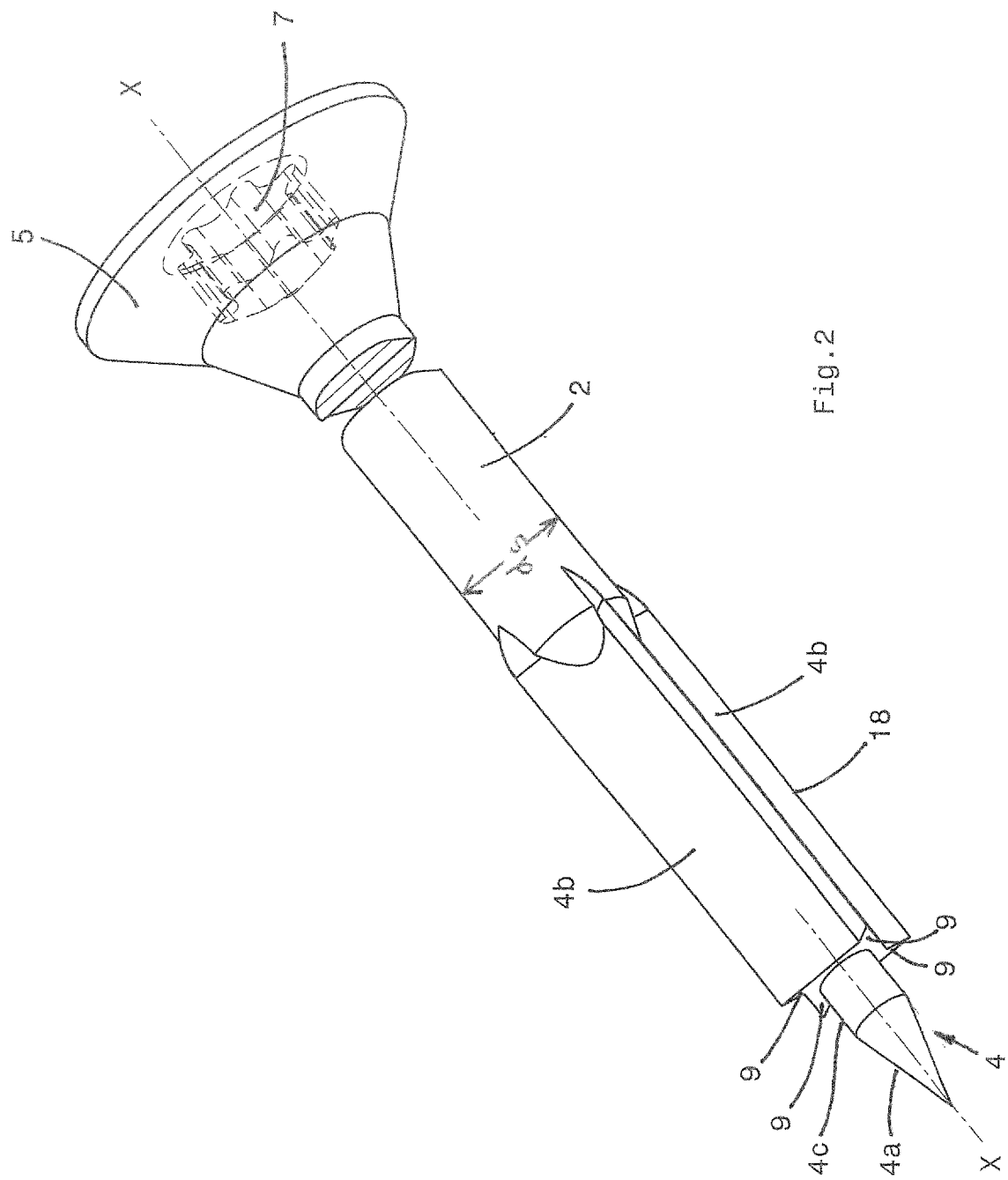
Figure 9:
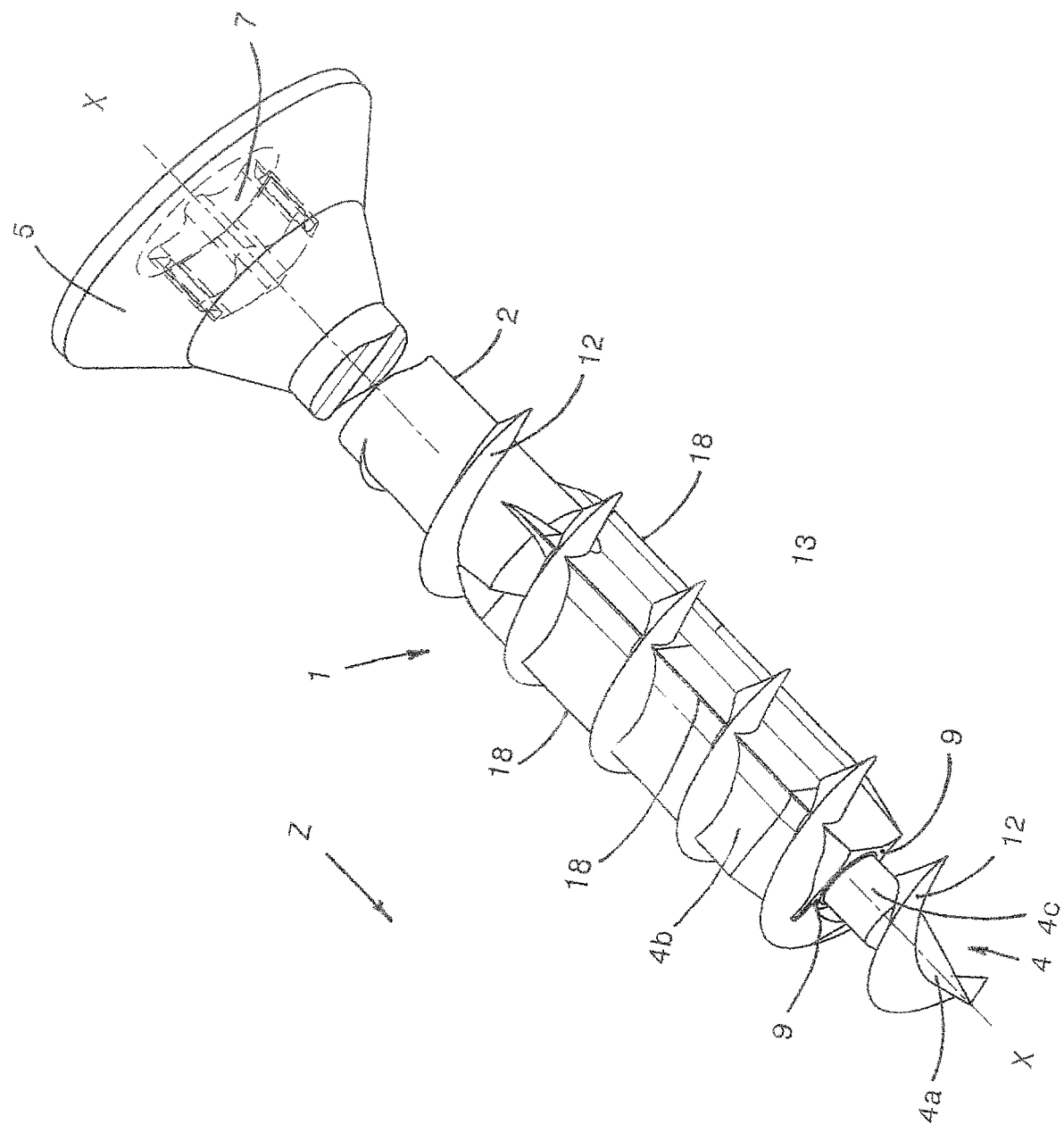
Figure 10:
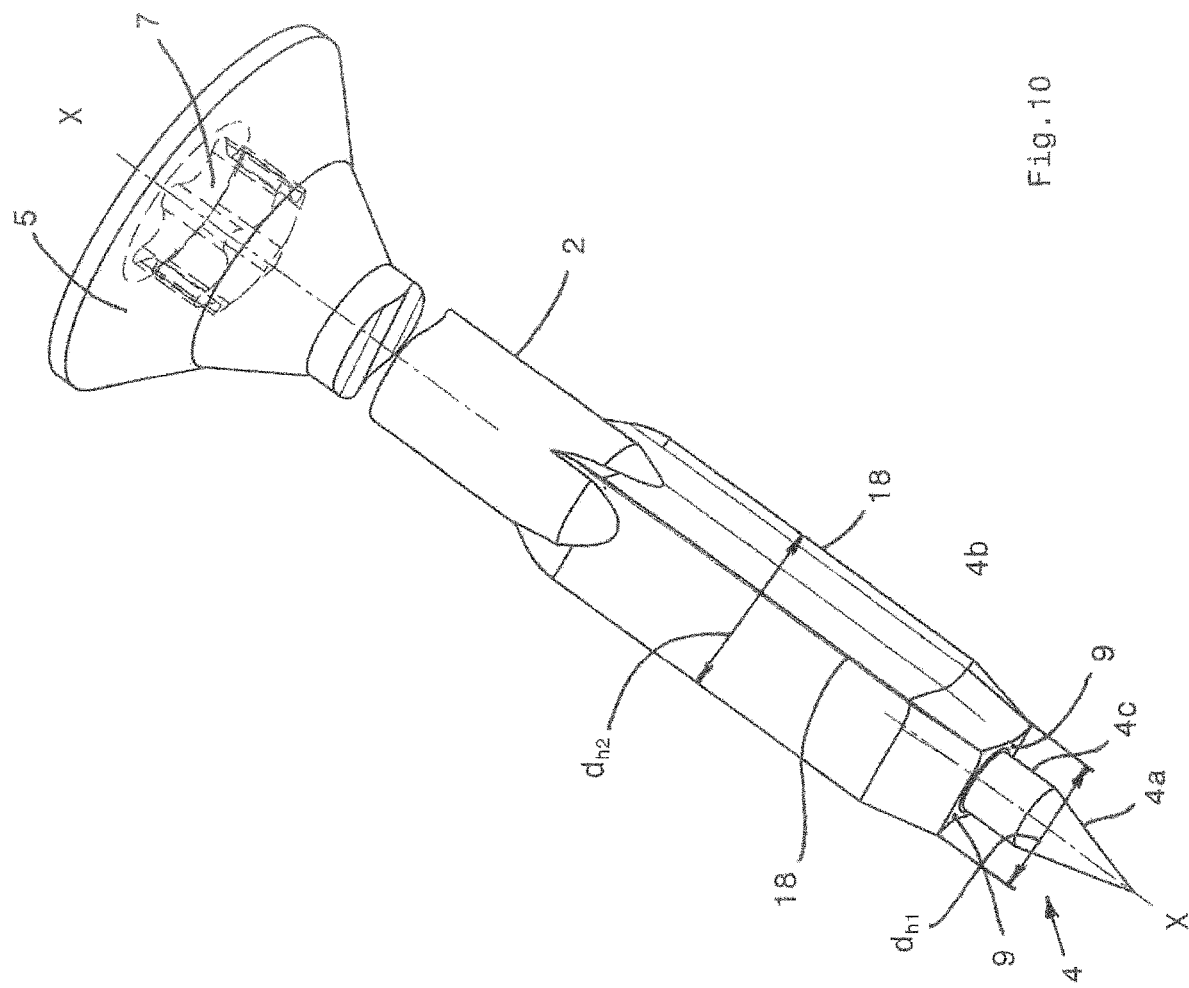

FIG. 1 shows a perspective view of a screw element according to the invention, FIG. 2 shows a perspective view of the screw element according to FIG. 1, however, without the screw thread, FIG. 3 shows a longitudinal section through FIG. 2, however, without the screw head, FIG. 3a to FIG. 3c show sectional views according to sectional lines A-A, B-B, and C-C in FIG. 3, FIG. 4, FIG. 5, and FIG. 6 show section views through alternative embodiments of the polygonal tip section of the screw element according to the invention, FIG. 7 shows a side view of the screw element according to the invention according to FIG. 1, FIG. 7a to FIG. 7c show sectional views through the screw element according to FIG. 7 along sectional lines A-A, B-B, and C-C, FIG. 8 shows a side view of the screw element according to FIG. 7, however in a position rotated 45° to the position in FIG. 7, FIG. 8a to FIG. 8c show sectional depictions along lines A-A, B-B, and C-C in FIG. 8, FIG. 9 shows a perspective view of another embodiment of a screw element according to the invention, FIG. 10 shows a perspective view of the screw element according to the invention according to FIG. 9, however, without the screw thread.

The same parts are always provided with the same reference numerals in the various figures of the drawing.

In addition to the subsequent description, it is claimed that the invention is not limited to the exemplary examples and thereby is not limited to all or a plurality of features of the combinations of features described; instead, each individual partial feature of the/each exemplary embodiment is in itself important for the subject matter of the invention, even when separated from all other partial figures described in conjunction with it, and also in combination with any features of another exemplary embodiment.

A screw element 1 according to the invention comprises, as depicted in the figures, a threaded shaft 2 and a screw tip 4 formed on its one end and a screw head 5, formed on the end opposite screw tip 4 and having force application means 7 for a turning tool. Screw head 5 may be formed, for example, as a countersunk head, round head, or flat head, and screw head 5 may also be formed as a cylindrical extension of threaded shaft 2. Force application means 7 may be formed as a slotted, philips head, or internal force application means, for example, in the form of a hexagon socket or a star socket, or, however, also, e.g., as an external hexagon on screw head 5.

A screw thread 12 extends on screw shaft 2 and screw tip 4. Thread 12 is preferably formed from a helically extending thread pitch 13, i.e. is formed as triangular in the radial cross section with respect to a longitudinal center axis X-X of screw element 1, see FIGS. 7, 8. It likewise lies within the scope of the invention if screw thread 12 according to the invention is a multiple thread screw thread, for example, formed from two helical thread pitches arranged circumferentially offset.

Screw thread 12 is advantageously formed as a self-tapping or self-forming thread. Thread 12 may have a constant thread pitch or a variable thread pitch across the entire threaded area. Thread 12 has a maximum thread diameter $d_g$, the nominal diameter of screw element 1 according to the invention, which is constant in the depicted exemplary embodiment in the area of threaded shaft 2, so that in this area, no change of the thread diameter is present. The thread pitch of screw thread 12 is preferably 40% to 70% of nominal diameter $d_g$ of screw thread 12, i.e., with respect to a single-thread thread.

The core diameter $d_s$ of screw element 1 is 55% to 70% of nominal diameter $d_g$, preferably 60% to 65% of nominal diameter $d_g$.

Screw tip 4 comprises according to the invention two tip sections 4a and 4c, i.e., when viewed in screw-in direction Z, first front tip section 4a tapering towards the screw element end and second tip section 4c connecting thereto. Connecting thereto is a section 4b with, when viewed in cross section perpendicular to the longitudinal center axis X-X, a polygonal cross section of its core having an enveloping circle 14 with a diameter dr, extending through the polygon corners, see FIG. 3b. First tip section 4a is formed as a pointed cone, as is depicted in FIG. 1, wherein its cone angle α may be 20° to 40°, in particular 30°, see FIG. 3. Cone-shaped first tip section 4a has a circular core cross section extending perpendicular with respect to center longitudinal axis X-X. Screw thread 12 extends across entire thread tip 4, wherein its radial thread height decreases to zero at the end of cone-shaped section 4a. In the area of second cylindrical tip section 4c, which is formed as circular in cross section, thread 12 extends with a preferably decreasing thread height. In the area of polygonal section 4b, thread 12 extends with a nominal diameter $d_g$, as in the area of threaded shaft 2. Diameter dr, of enveloping circle 14 of polygonal section 4b is greater than core diameter $d_s$ of the screw core, see FIG. 3. A core diameter $d_k$ of cylindrical tip section 4c is smaller than core diameter $d_s$ and is preferably 40% to 60% of core diameter $d_s$ of shaft 2, in particular 50% of core diameter $d_s$. According to the invention, at the transition at section 4b between second tip section 4c to polygonal section 4b, at least one front edge surface 9 is present which ends in a corner point 15 of the polygonal cross section with lies radially oriented with respect to longitudinal center axis X-X, i.e. in the sense of an increase of the diameter. This radially extending front edge surface 9 forms a type of cutting or milling edge. In the exemplary embodiment depicted, the polygonal cross section of section 4b has four corner points 15, so that four front face surfaces 9 are formed, see FIG. 2, i.e., with respect to the periphery of screw element 1 according to the invention.

As is particularly clear from FIG. 1, screw thread 12 extends across first, second tip sections 4a, 4c and across section 4b without interruption, so that screw thread 12 is also formed in the area of front surface edges 9.

In FIG. 2, in which only the screw core of screw element 1 according to the invention is depicted, i.e., the screw core in the area of threaded shaft 2 and in the area of threaded tip 4, the design of front surface edge 8 in the transition from second tip section 4c to section 4b is clearly visible. Front surface edges 9 hereby extend radially to longitudinal axis X-X. Advantageously, enveloping circle 14, not shown in FIG. 2, of polygonal section 4b has a diameter $d_n$, which is greater than or equal to an in particular maximum core diameter $d_s$ of threaded shaft 2, which is circular in cross section. It is hereby advantageous if enveloping circle diameter dr, of section 4b, which is polygonal in cross section, is constant across its axial length. As is clear in the individual figures, diameter $d_k$ of cylindrical second tip section 4c is smaller than maximum core diameter $d_s$ of threaded shaft 2 at the base of the second tip section in the transition between second tip section 4c and polygonal section 4b. Furthermore, it is provided according to the invention that screw thread 12 has a nominal diameter $d_g$ in the area of section 4b and likewise at shaft section 2, which is greater than maximum enveloping circle diameter dr, of polygonal section 4b.

The pitch of thread 12 is 40% to 70% of nominal diameter $d_g$ of screw element 1. The thread length is in particular greater than or equal to 4 times nominal diameter $d_g$, with a pitch in particular of 60%-65% of nominal diameter $d_g$. For thread lengths less than 4 times nominal diameter $d_g$, the pitch is preferably 40% to 50% of nominal diameter $d_g$.

For thread lengths greater than or equal to 4 times nominal diameter $d_g$, the pitch may likewise be 40% to 45% of nominal diameter $d_g$.

In the exemplary embodiment shown, thread 12 extends across the entire length of threaded shaft 2. It is likewise within the scope of the invention if thread 12 does not extend across the entire length of threaded shaft 2, but instead, that a thread-free shaft section is formed, for example, between the thread section of threaded shaft 2 and screw head 4, so that only a partial thread is present on threaded shaft 2. The partial thread may also be formed in that a thread section, which connects to screw head 5, is followed by a thread-free shaft section, and following in turn, a threaded section is connected to the shaft.

Furthermore, it may be advantageous according to the invention if the length L of tip section 4 lies in the range from at least 1.0 times up to a maximum of 2.0 times the pitch s of thread 12, in particular of thread 12 in the area of tip section 4. Advantageously, length L lies in the range of 1.0 to 1.5 times thread pitch s or in a range greater than 1.5 times and less than or equal to 2.0 times thread pitch s.

As is particularly clear from FIGS. 3b and 4 to 6, section 4b is formed as polygonal in cross section in such a way that it forms a quadrilateral with four corner points 15. It is hereby expedient if four corner points 15 each extend orthogonal to center longitudinal axis X-X, lie on intersecting straight lines $g_1$, $g_2$ of the polygonal cross section, and each have the same distance b from longitudinal axis X-X. It is hereby expedient according to the invention if—when viewed in cross section—core sides 22 connecting corner points 15 are formed as concave, as this is clear in particular in FIG. 6. Core sides 22 may also extend in a straight line. In the exemplary embodiments shown, a quadrilateral is depicted as the polygonal cross section of section 4b; however, a triangular cross section may likewise be selected according to the invention, or also a cross section that has more than four corners. A regular cross sectional design is preferred. Corner points 15 of the individual cross sections, lying one after the other in the longitudinal direction of cross-sectional section 4b, lie on straight lines extending parallel to center longitudinal axis X-X, so that straight line core edges 18 are formed, and thus may have an additional milling effect, provided that a rebound of the material occurs in which screw element 1 according to the invention is screwed into. As is shown in FIG. 6, the polygonal, quadrilateral cross section of section 4b may be formed in each case with mirror symmetry about orthogonal straight lines $g_1$, $g_2$. A shape deviating therefrom is depicted in FIG. 4, wherein core sides 22 or the core side surfaces resulting therefrom of the entire section are formed in such a way that an asymmetry results with respect to orthogonal straight lines $g_1$, $g_2$. An embodiment is depicted in FIG. 4, in which the lateral sections or surface sections, which arise from each corner point 15 or core edge 18 and point in the direction of rotation, extend sharply radially in the direction of the longitudinal axis X-X in such a way that straight lines $g_1$, $g_2$ extending respectively through corner point 15 define an acute angle ß<20° and then extend in an approximately straight line to that corner point 15 following in the direction of rotation. This type of shape according to the invention is depicted in FIG. 4 for a clockwise direction of rotation D, and a corresponding shape is depicted in FIG. 5 with a counter-clockwise direction of rotation D. A polygonal cross-sectional shape of section 4b is depicted in FIGS. 3 to 3c corresponding to FIG. 4. A corresponding cross-sectional shape of polygonal section 4b is also selected in FIGS. 7 and 8. By forming the polygonal cross section according to FIGS. 4 and 5, an improved cutting effect or milling effect of cutting edges 18 is achieved, which applies for the embodiment according to FIG. 4. In the embodiment according to FIG. 5, it is correspondingly achieved that in a direction of rotation D of rotational action during loosening a screw according to the invention, a higher resistance is opposed to a loosening.

One embodiment of screw element 1 according to the invention is depicted in FIGS. 9 and 10 which substantially corresponds to screw element 1 according to FIGS. 1 to 8, wherein, however, a difference accordingly exists, in that enveloping circle diameter $d_h$ of enveloping circle 14 of polygonal section 4b is not constant and equal in size over the entire length of section 4b, but instead that enveloping circle diameter $d_h$, beginning with a diameter $d_{h1}$ in the area of front edge surfaces 9, becomes larger in the direction toward threaded shaft 2, i.e., becomes preferably continuously larger up to maximum enveloping circle diameter $d_{h2}$ in the remaining area of polygonal section 4b. The length, over which an increase of enveloping circle diameter $d_h$ is carried out up to the maximum diameter, is hereby preferably 10% to 50% of the entire length of polygonal section 4b. The diameter difference between enveloping circle diameter $d_{h1}$ in the area of front surface edge 9 and maximum enveloping circle diameter $d_{h2}$ of polygonal section 4b, in which a constant enveloping circle diameter $d_{h2}$ is present, is 5% to 20% of maximum enveloping circle diameter dn.

In screw element 1 according to the invention, as depicted in the individual figures, an outer thread edge of thread 12 extends in the area of threaded shaft 2 and also across polygonal section 4b with a constant radius and a constant thread height. Thread pitch 13 extends in a spiral shape across the area of truncated cone tip section 4 and up to its end with a radius continuously decreasing to zero and a continuously decreasing thread height.

In one advantageous embodiment, not depicted in the drawings, the thread edge of thread 12 may additionally be formed as corrugated at least in the area of tip section 4 and at the same time in the area of the thread flank surface in such a way that a sequence of corrugation peaks and corrugation troughs is present. Reference is made to the full extent to document DE 3335092 A1.

The invention is not limited to the depicted and described exemplary embodiments, but instead also comprises all similarly acting embodiments in the meaning of the invention. It is expressly emphasized that the exemplary embodiments are not limited to all features in combination; rather, each individual partial feature may have an intrinsic inventive importance, even separated from all other partial features. Furthermore, the invention is currently also not limited to the combination of features defined in claim 1, but instead may also be defined by any other combination of specific features of all individual features disclosed as a whole. This means that, in principle, virtually each individual feature of claim 1 may be omitted or may be replaced by at least one individual feature disclosed at another point in the application.

LIST OF REFERENCE NUMERALS

1 Screw element
2 Threaded shaft
4 Screw tip
4a Tip section
4b Polygonal section
4c Second cylindrical tip section
5 Screw head
7 Force application means
9 Front edge surface (front surface edge)
12 Screw thread
13 Thread pitch
14 Enveloping circle
15 Corner points
18 Core edges (cutting edges)
22 Core sides
b Distance
D Direction of rotation
$d_g$ Thread diameter
$d_h$ Enveloping circle diameter
$d_{h1}$ Enveloping circle diameter
$d_{h2}$ Enveloping circle diameter
$d_k$ Core diameter of 4c
$d_s$ Core diameter of threaded shaft 2
$g_1$ Orthogonal straight line
$g_2$ Orthogonal straight line
X-X Center longitudinal axis
Z Screw-in direction

The invention claimed is:
1. Screw element (1) comprising:
a threaded shaft (2);
a screw tip (4) formed on one shaft end;
a screw head (5), formed on an opposite shaft end, the screw head (5) including a force application means (7); and
a screw thread (12) extending on the threaded shaft (2) and on the screw tip (4), wherein the screw tip (4) has a front tip section (4a) tapering toward the screw element end, when viewed in the screwing-in direction (Z), and a polygonal section (4b) formed on the threaded shaft with a polygonal cross section, when viewed in cross section, whose enveloping circle diameter ($d_h$) is greater than a core diameter ($d_k$) of the screw tip (4), and the polygonal cross section has a corner point (15) lying on the enveloping circle (14) of the polygonal section (4b), and a front edge surface (9), radially oriented with respect to a longitudinal center axis (X-X), ends in said corner point,
and whereby the screw tip (4) has a first tapering tip section (4a) with a circular cross section and a second, cylindrical tip section (4c) with a circular cross section formed between the first tip section (4a) and the polygonal section (4b), wherein the screw thread (12) is continuously formed without interruption across the first and second tip sections (4a, 4c) of the screw tip (4)
characterized in that the core diameter ($d_k$) of the cylindrical second tip section (4c) is smaller at its base in the transition between the second tip portion (4c) and the polygonal section (4b) than the maximum core diameter ($d_s$) of the threaded shaft (2).

2. Screw element (1) according to claim 1,
characterized in that a tip length (L) of the screw tip (4) is 1.0 to 2.0 times the pitch of the screw thread (12).

3. Screw element (1) according to claim 1,
characterized in that a tip length (L) of the screw tip (4) is greater than 1.5 times and less than or equal to 2.0 times the pitch of the screw thread (12).

4. Screw element (1) according to claim 1, characterized in that a diameter of the second cylindrical tip section (4c) is 40% to 60% of the core diameter ($d_s$) of the threaded shaft (2).

5. Screw element (1) according to claim 4, characterized in that the diameter of the second cylindrical tip section (4c) is 50% of the core diameter ($d_s$) of the threaded shaft (2).

6. Screw element (1) according to claim 1, characterized in that an inner angle of the tapering first tip section (4a) is 20° to 40°.

7. Screw element according to claim 1, characterized in that the core diameter ($d_s$) of the threaded shaft is 55% to 70% of a nominal diameter ($d_g$) of the screw element.

8. Screw element (1) according to claim 1, characterized in that a pitch of the screw thread (12) is 40% to 70% of a nominal diameter ($d_g$) of the screw element.

9. Screw element (1) according to claim 8, characterized in that the pitch of the screw thread (12) is 40% to 45% or 60% to 65% of the nominal diameter ($d_g$) for thread lengths greater than or equal to 4 times the nominal diameter ($d_g$), and is 40% to 50% of the nominal diameter ($d_g$) for thread lengths less than 4 times the nominal diameter ($d_g$).

10. Screw element (1) according to claim 1, characterized in that the enveloping circle (14) of the polygonal section (4b) has a diameter ($d_h$) which is greater than or equal to the maximum core diameter ($d_s$) of the threaded shaft (2).

11. Screw element (1) according to claim 1, characterized in that the enveloping circle diameter ($d_h$) of the polygonal section (4b) of the threaded shaft (2) is constant across its axial length.

12. Screw element (1) according to claim 1, characterized in that the polygonal section (4b) has a first enveloping circle diameter ($d_{h1}$) at the transition to the second tip section (4c) that is smaller than a second enveloping circle diameter ($d_{h2}$) at the end of the polygonal section (4b) facing the threaded shaft (2).

13. Screw element (1) according to claim 1, characterized in that the screw thread (12) has a nominal diameter ($d_g$) in the area of the polygonal section (4b) and in the remaining shaft section (2), which nominal diameter is greater than the maximum enveloping circle diameter ($d_h$) in the area of the polygonal section (4b).

14. Screw element (1) according to claim 1, characterized in that the thread outer diameter at the screw tip (4) increases from the screw element end from 0 to a nominal diameter ($d_g$) on the polygonal section (4b).

15. Screw element (1) according to claim 1, characterized in that the polygonal cross section of the polygonal section (4b) has at least three corner points (15) which lie on the enveloping circle (14) of the polygonal section (4b).

16. Screw element (1) according to claim 15,
characterized in that the cross section of the polygonal section (4b) has four corner points (15), wherein the four corner points (15) intersect on two orthogonally straight lines ($g_1$, $g_2$) of the polygonal cross section intersecting in the center longitudinal axis (X-X) and each is the same distance (b) from the longitudinal axis (X-X).

17. Screw element (1) according to claim 16,
characterized in that the four corner points (15) of the polygonal cross section of the polygonal section (4b) are each arranged one after the other on straight lines extending parallel to center longitudinal axis (X-X) in the longitudinal direction, so that straight core edges (18) are formed.

18. Screw element (1) according to claim 16,
characterized in that the corner points (15) of the polygonal cross section are connected by core sides (22), which have a concave configuration in such a way that a polygonal cross section is formed that is configured with mirror symmetry to the straight lines ($g_1$, $g_2$) extending orthogonally through the corner points (15).

19. Screw element (1) according to claim 18,
characterized in that the core sides (22), which connect the corner points (15) of the polygonal section, are designed as asymmetrical with respect to the straight lines ($g_1$, $g_2$) extending orthogonally through the corner points (15).

20. Screw element (1) according to claim 1, characterized in that the thread (12) has an outer thread edge which extends in a spiral shape in the axial direction, when viewed in the direction of the center longitudinal axis (X-X), and has a constant radius in the area of the threaded shaft (2) and has a continuously decreasing radius in a spiral shape in the area of the screw tip (4).

* * * * *